(12) United States Patent
Tokuda et al.

(10) Patent No.: US 11,600,975 B2
(45) Date of Patent: Mar. 7, 2023

(54) WIRE HARNESS ROUTING METHOD, WIRE HARNESS ROUTING STRUCTURE, AND WIRE HARNESS PROTECTOR

(71) Applicant: YAZAKI CORPORATION, Tokyo (JP)

(72) Inventors: Tatsuya Tokuda, Makinohara (JP); Takuya Karaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/572,572

(22) Filed: Jan. 10, 2022

(65) Prior Publication Data

US 2022/0224089 A1 Jul. 14, 2022

(30) Foreign Application Priority Data

Jan. 12, 2021 (JP) .............................. JP2021-002958

(51) Int. Cl.
*H02G 1/00* (2006.01)
*H02G 3/04* (2006.01)
*B60R 16/02* (2006.01)
*H01B 13/012* (2006.01)

(52) U.S. Cl.
CPC ....... *H02G 3/0437* (2013.01); *B60R 16/0215* (2013.01); *H01B 13/01263* (2013.01); *H02G 1/00* (2013.01)

(58) Field of Classification Search
CPC .... H02G 3/0437; H02G 1/00; B60R 16/0215; H01B 13/01263
USPC ....................................................... 174/72 A
See application file for complete search history.

(56) References Cited

U.S. PATENT DOCUMENTS

| | | | |
|---|---|---|---|
| 2010/0147584 A1* | 6/2010 | Suzuki | B60R 16/0215 |
| | | | 174/72 C |
| 2016/0284440 A1* | 9/2016 | Adachi | B60R 16/0215 |
| 2016/0365170 A1* | 12/2016 | Wakabayashi | B60R 16/0215 |

FOREIGN PATENT DOCUMENTS

| | | | |
|---|---|---|---|
| EP | 3072748 A1 | | 9/2016 |
| JP | H07-95714 A | | 4/1995 |
| JP | H0965541 | * | 3/1997 |
| JP | 2000236609 | * | 8/2000 |
| JP | 2001-95126 A | | 4/2001 |
| JP | 2009-65798 A | | 3/2009 |
| JP | 4403987 B2 | | 1/2010 |
| JP | 2011250522 | * | 12/2011 |
| JP | 2012085478 | * | 4/2012 |
| JP | 2014045608 | * | 3/2014 |
| JP | 2014207738 | * | 10/2014 |
| JP | 2015167450 | * | 9/2015 |
| JP | 2015188294 | * | 10/2015 |

(Continued)

*Primary Examiner* — Timothy J Thompson
*Assistant Examiner* — Michael F McAllister
(74) *Attorney, Agent, or Firm* — Kenealy Vaidya LLP

(57) ABSTRACT

A wire harness routing method is provided. A wire harness is routed on a protector base. A protective tape is wound around an outer periphery of the wire harness at a position outside an end portion of the protector base in a longitudinal direction. A cover is put on the protector base under the above state. The wire harness is fixed to, by winding a binding band at a position where the tape is wound, a wire harness-fixed protruding piece protruding outward in the longitudinal direction from an end portion of the cover in the longitudinal direction.

5 Claims, 8 Drawing Sheets

(56) References Cited

FOREIGN PATENT DOCUMENTS

WO 2016/117366 A1 7/2016

\* cited by examiner

WIRE HARNESS ROUTING METHOD, WIRE HARNESS ROUTING STRUCTURE, AND WIRE HARNESS PROTECTOR

CROSS-REFERENCE TO RELATED APPLICATIONS

This application is based on and claims priority under 35 USC 119 from Japanese Patent Application No. 2021-002958 filed on Jan. 12, 2021, the contents of which are incorporated herein by reference.

TECHNICAL FIELD

The present invention relates to a wire harness routing method that fixes a wire harness to a fixing target member such as a vehicle body using a protector, a wire harness routing structure, and a wire harness protector used for the routing method and the routing structure.

BACKGROUND ART

When a wire harness routed in a vehicle is fixed to a fixing target member such as a vehicle body, a protector is widely used from a viewpoint of wire harness protection. A protector having a gutter-like protector base having a wire harness accommodation space therein and a cover to be put on an open upper face of the protector base is generally well known as the protector.

This type of protector is often provided with a protruding piece at an end portion of the protector base in a longitudinal direction for fixing the wire harness with a binding band, a tape, or the like. For example, Patent Literature 1 discloses a protector in which a protruding piece extending in a tongue-like shape is provided at an end portion of a bottom wall of a protector base in a longitudinal direction, and a wire harness is fixed to the protruding piece by a binding band or a tape.

Incidentally, when the wire harness is fixed to the protruding piece of the protector base by, for example, the binding band, in order to prevent a side slip of the wire harness after the fixing or to reduce hitting on the wire harness by the binding band, that is, in order to protect the wire harness, a protective tape is wound around an outer periphery of the wire harness in advance, and the binding band is used to fasten the protective tape together with the protruding piece from above the protective tape. In this case, the protective tape is preferably wound only around the outer periphery of the wire harness.

However, if the wire harness-fixed protruding piece is provided on the protector base as described above, when the protective tape is wound around the outer periphery of the wire harness, the protruding piece may be wound together with the tape. Therefore, in order to prevent the protruding piece from being wound together, the tape is wound while lifting the wire harness. As a result, when the wire harness is lifted, a position of electric wires of the wire harness may be deviated or an electric wire bundle may be collapsed.

CITATION LIST

Patent Literature

Patent Literature 1: JP-2001-95126-A

SUMMARY OF INVENTION

The present invention has been made in view of the above-described circumstances, and an object thereof is to provide a wire harness routing method, a wire harness routing structure, and a wire harness protector used therefor. According to the present invention, when a protective tape is wound around an outer periphery of the wire harness on a protector base, it is not necessary to lift the wire harness, so that a tape winding operation can be easily performed.

According to one embodiment, a wire harness routing method includes:

preparing a gutter-like protector base in which an upper face thereof is open, and routing a wire harness inside the protector base so as to extend in a longitudinal direction of the protector base;

winding a wire harness-protective tape around an outer periphery of the wire harness at a position outside an end portion of the protector base in the longitudinal direction;

putting, in a state that the wire harness-protective tape has wound around the outer periphery of the wire harness, a cover on the protector base so as to cover the open upper face of the protector base; and fixing, by a fixing unit, at a position where the tape is wound, the wire harness to a wire harness-fixed protruding piece protruding outward in the longitudinal direction from an end portion of the cover in the longitudinal direction.

According to one embodiment, a wire harness routing structure routes a wire harness by using a wire harness protector. The wire harness routing structure includes a wire harness protector having a gutter-like protector base whose upper face is open and whose internal space serves as an accommodation space for a wire harness to extend along a longitudinal direction, and a cover to be put on the protector base so as to cover the open upper face of the protector base. The wire harness protector is disposed on a routing path of a wire harness in a state that the protector base is fixed to a fixing target member, the wire harness is routed inside the protector base so as to extend in the longitudinal direction of the protector base, a wire harness-protective tape is wound around an outer periphery of the wire harness at a position outside an end portion of the protector base in the longitudinal direction, the cover is put on the protector base so as to cover the open upper face of the protector base, and the wire harness is fixed by a fixing unit, at a position where the tape is wound, to a wire harness-fixed protruding piece provided to protrude outward in the longitudinal direction from an end portion of the cover in the longitudinal direction.

According to one embodiment, a wire harness protector includes: a gutter-like protector base in which an upper face thereof is open and in which an inner space thereof serves as an accommodation space for a wire harness to extend along a longitudinal direction of the protector base; and a cover to be put on the protector base so as to cover the open upper face of the protector base. The protector base is configured as a member to be fixed to a fixing target member, and a wire harness-fixed protruding piece is provided on an end portion of the cover in the longitudinal direction, the protruding piece extending outward from an end portion of the protector base in the longitudinal direction when the cover is put on the protector base.

BRIEF DESCRIPTION OF DRAWINGS

FIG. 7 is a front view showing a state where the cover is put on.

DESCRIPTION OF EMBODIMENTS

A specific embodiment according to the present invention will be described below with reference to the drawings.

Figure 1:
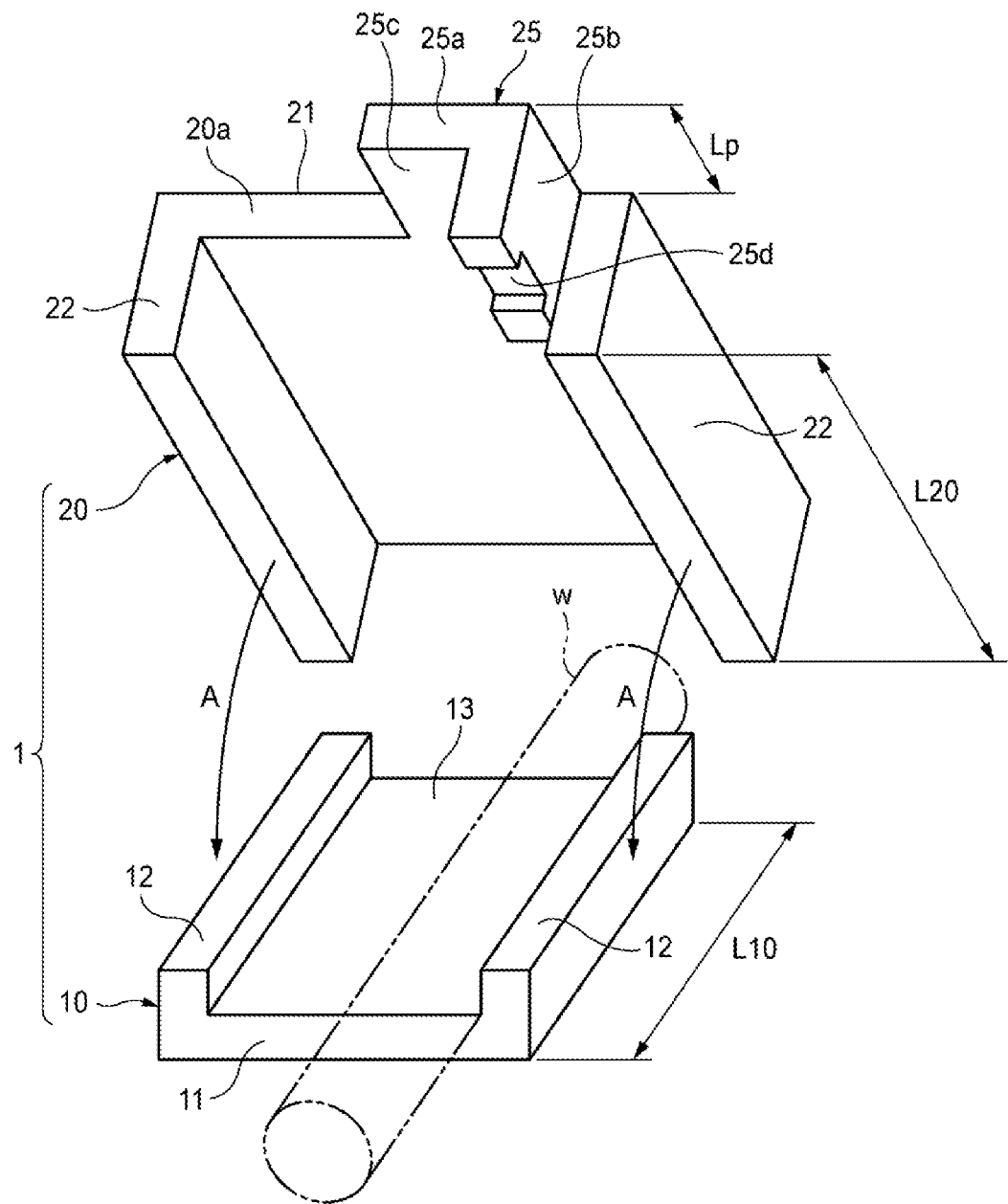
FIG. 1 is a perspective view showing a configuration of a wire harness protector according to an embodiment of the present invention.

FIG. 1 is a perspective view showing a configuration of a wire harness protector used for implementing a wire harness routing method and a wire harness routing structure according to the present embodiment.

A wire harness protector 1 shown in FIG. 1 includes a protector base 10 as a protector body and a cover 20 to be put on the protector base 10. Both the protector base 10 and the cover 20 are integrally molded articles of resin.

The protector base 10 is a gutter-like member whose upper face is open and whose inner space serves as an accommodation space 13 for a wire harness W to extend along a longitudinal direction of the protector base 10. The protector base 10 includes a bottom wall 11 and a pair of left and right side walls 12. The protector base 10 is fixed to a case of a vehicle body or an electrical component, or a fixing target member such as sheet metal for fixing the electrical component, through any portion of the bottom wall 11 or the side walls 12.

The cover 20 is a member attached to the protector base 10 so as to cover the open upper face of the protector base 10. The cover 20 includes an upper wall 21 facing the bottom wall 11 of the protector base 10 and a pair of left and right side walls 22 putting on the outside of the side walls 12 of the protector base 10. The cover 20 is attached to the protector base 10 as indicated by an arrow A in the drawing, is not directly fixed to the fixing target member such as the vehicle body, and is engaged with the protector base 10 by an engagement unit (not shown) so as not to be detached.

The wire harness W is set on the protector base 10 so as to extend along the longitudinal direction of the protector base 10 and the cover 20. Here, a length L20 of a main portion of the cover 20 is set to be equal to a length L10 of the protector base 10.

One end portion 20a of the cover 20 in the longitudinal direction is provided with a wire harness-fixed protruding piece 25 which extends outward from an end portion of the protector base 10 in the longitudinal direction when the cover 20 is attached to the protector base 10. A protruding length Lp of the protruding piece 25 is set to a length appropriate for tape winding and binding band winding, which will be described later.

The wire harness-fixed protruding piece 25 has an L-shaped cross section when viewed from the front in the longitudinal direction of the cover 20. The protruding piece 25 includes a protruding piece upper wall 25a flush with the upper wall 21 of the cover 20 and a protruding piece side wall 25b parallel to the side wall 22 of the cover 20. The protruding piece 25 is disposed at a position close to the one side wall 22 in a width direction of the cover 20, and is configured such that the wire harness W can be accommodated in an inner corner space 25c of an L-shaped cross-sectional wall formed by the protruding piece upper wall 25a and the protruding piece side wall 25b. However, the protruding piece side wall 25b is provided at a position inside the side wall 22 of the cover 20. A recessed portion 25d for positioning a band portion of a binding band (described later) is provided at a lower end edge of the protruding piece side wall 25b.

Next, the wire harness routing method and the wire harness routing structure using the wire harness protector 1 configured as described above will be described.

Figure 2:
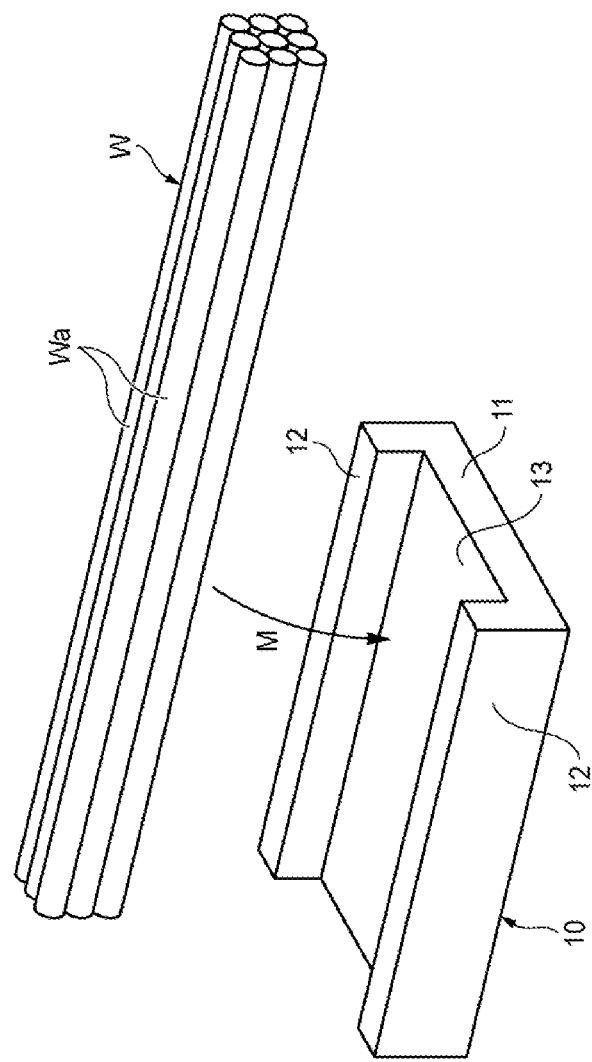
FIG. 2 is a perspective view showing a state in which a wire harness is to be set on a protector base of the wire harness protector according to the embodiment.
Figure 3:
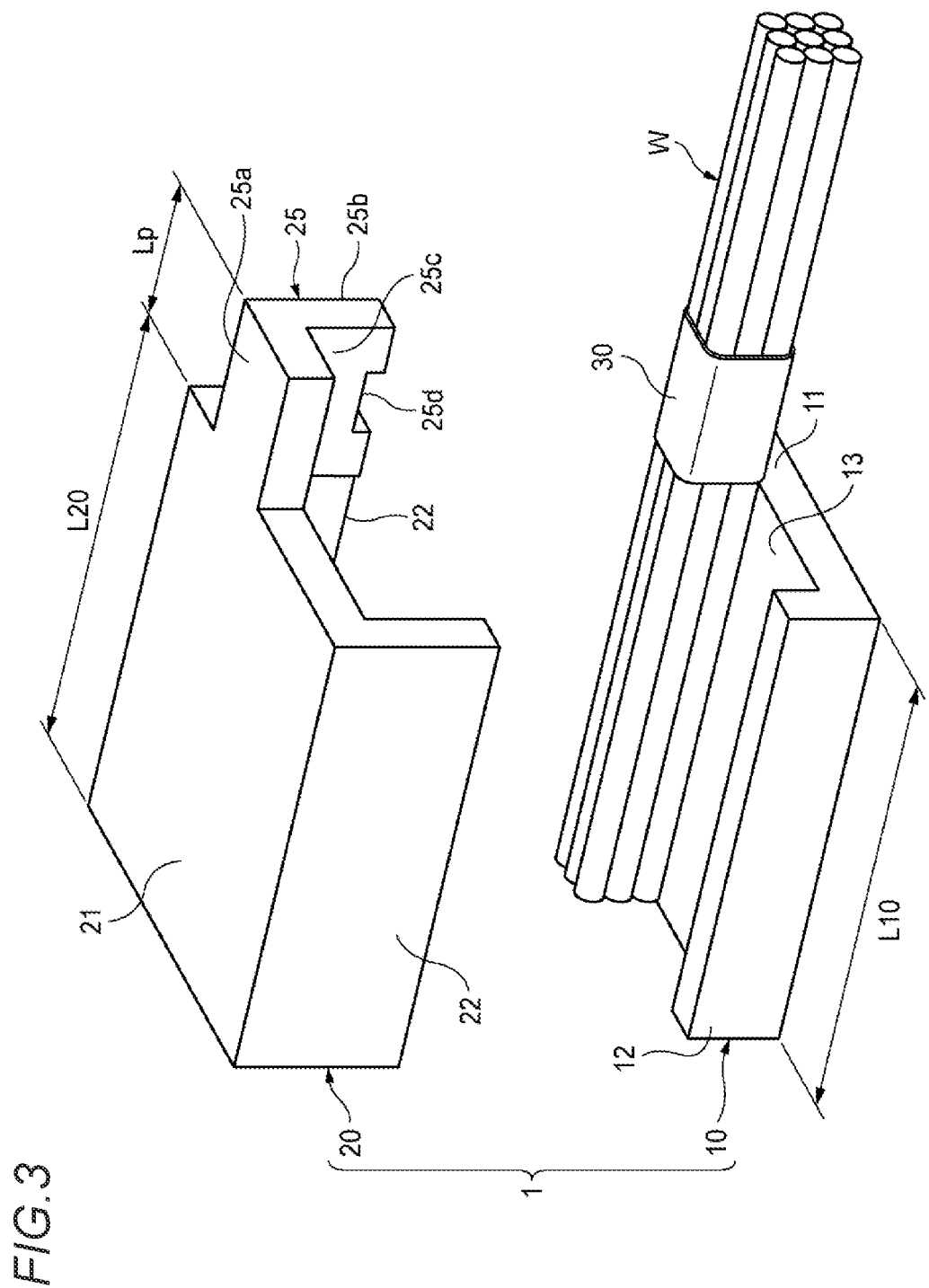
FIG. 3 is a perspective view showing a state in which a protective tape is wound around an outer periphery of a necessary portion of the wire harness set on the protector base and a cover is put on the protector base.
Figure 4:
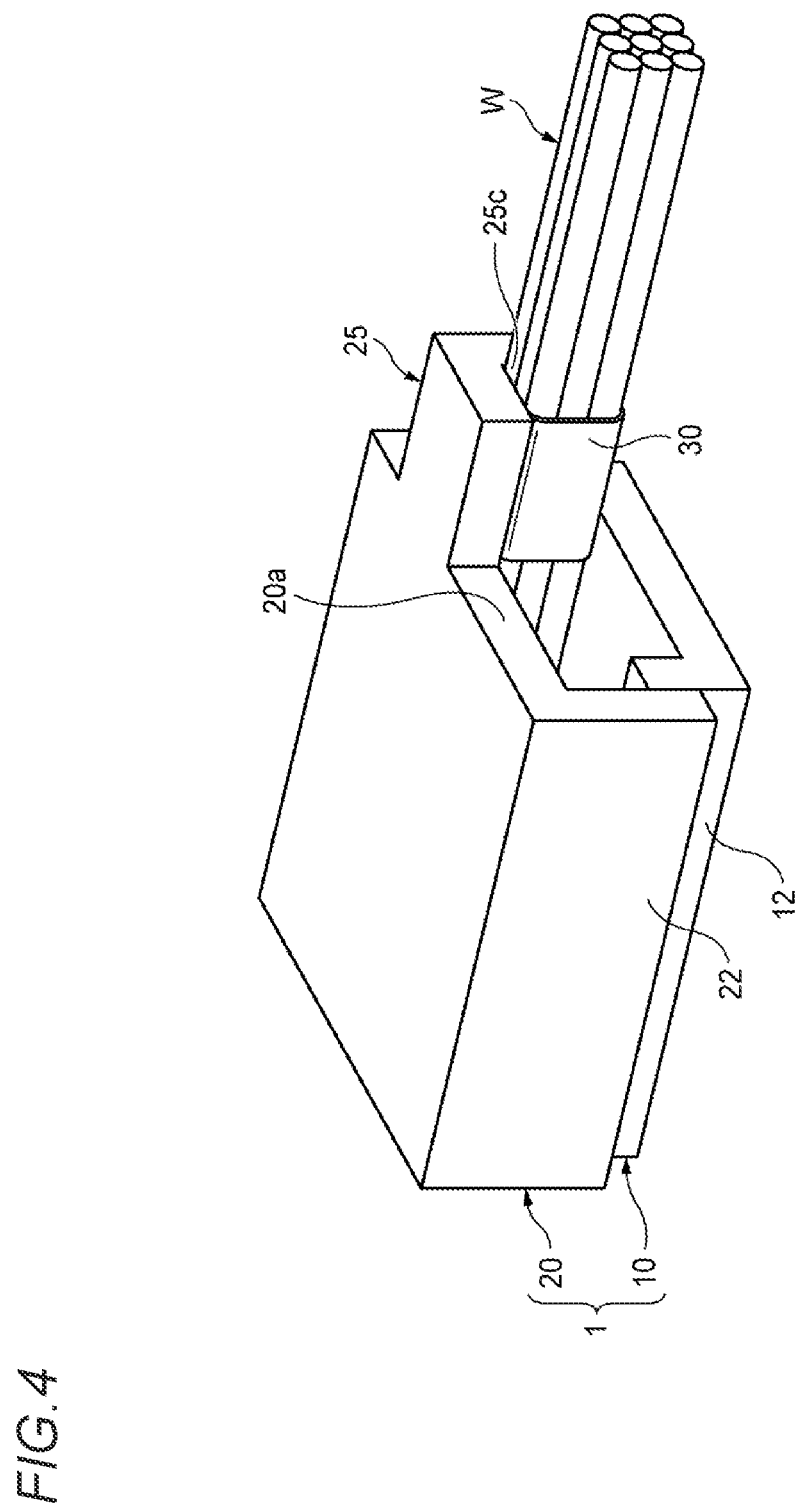
FIG. 4 is a perspective view showing a state immediately before the cover is put on the protector base and the wire harness is fastened by a binding band.
Figure 5:
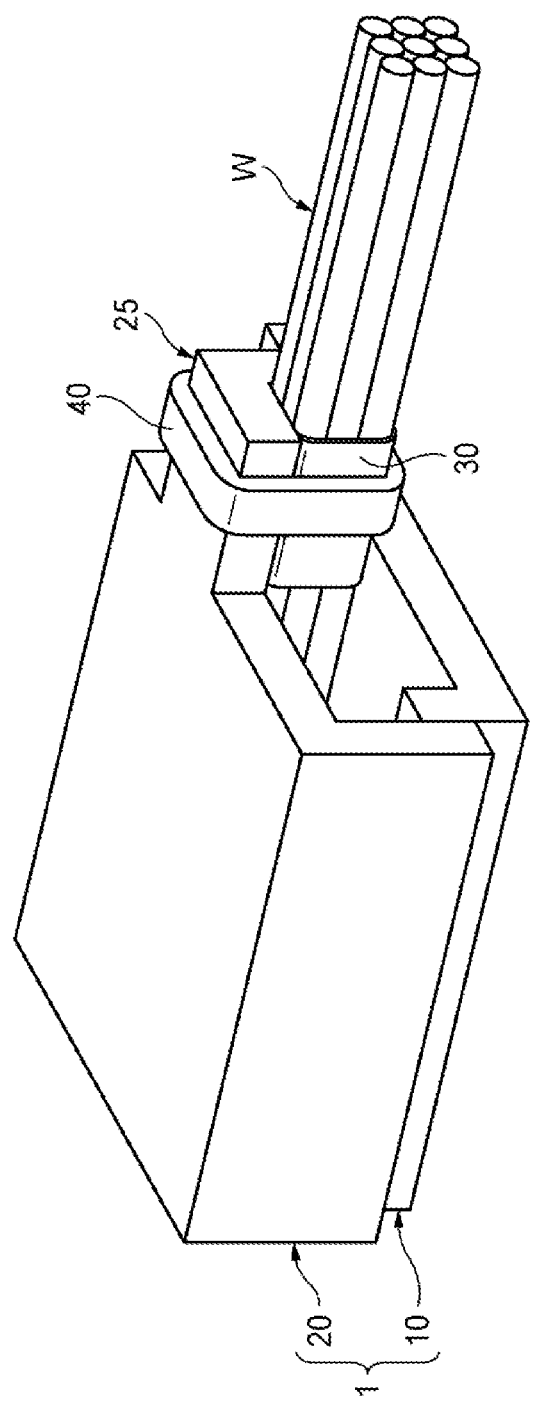
FIG. 5 is a perspective view showing a completed state of a routing structure in which the binding band is wound around a portion of the wire harness around which the tape is wound and a protruding piece provided on a cover side and fastened.
Figure 6:
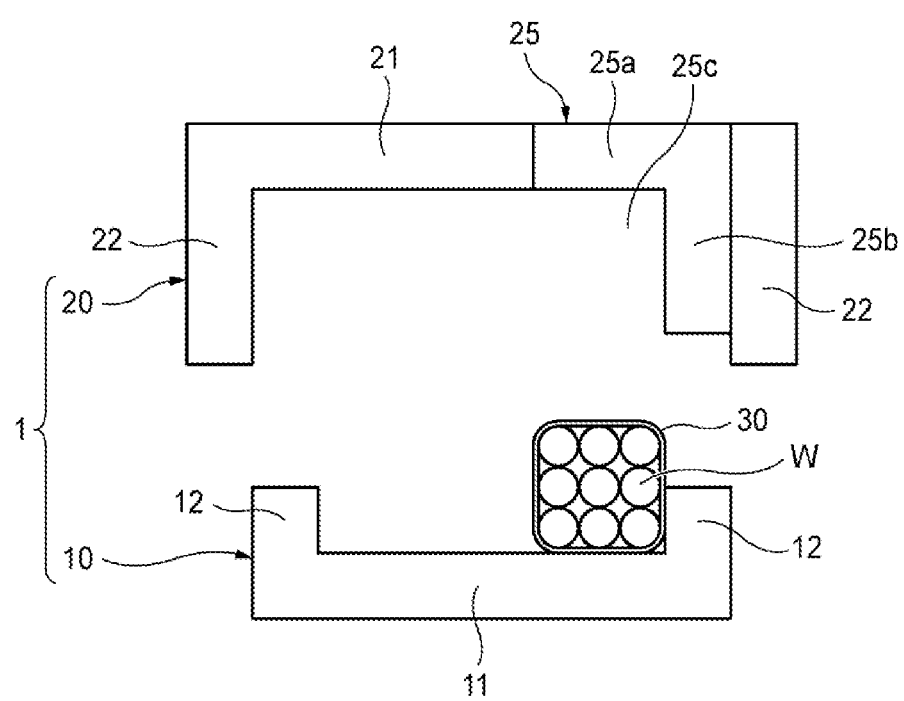
FIG. 6 is a front view showing the state shown in FIG. 3.
Figure 7:
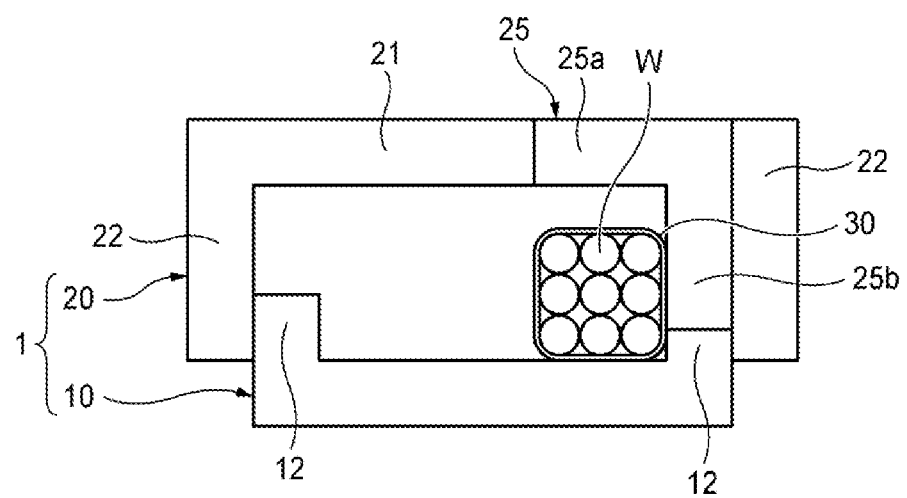
Figure 8:
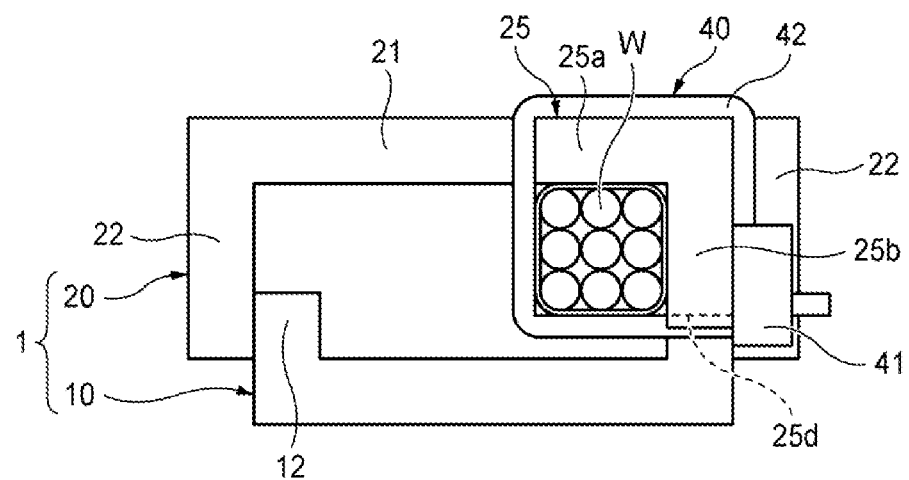
FIG. 8 is a front view showing the state shown in FIG. 5.

FIGS. 2 to 8 are views showing step contents of the routing method. FIG. 2 is a perspective view showing a state in which the wire harness W is to be set on the protector base 10 of the wire harness protector 1. FIG. 3 is a perspective view showing a state in which a protective tape is wound around an outer periphery of a necessary portion of the wire harness set on the protector base and the cover is put on the protector base. FIG. 4 is a perspective view showing a state immediately before the cover is put on the protector base and the wire harness is fastened by the binding band. FIG. 5 is a perspective view showing a completed state of the routing structure in which the binding band is wound around a portion of the wire harness around which the tape is wound and a protruding piece provided on a cover side and fastened. FIG. 6 is a front view showing the state in FIG. 3. FIG. 7 is a front view of a state where the cover is put on. FIG. 8 is a front view showing the state in FIG. 5.

In a routing procedure, first, the protector base 10 is disposed on a routing path of the wire harness W formed of a bundle of a plurality of electric wires Wa and is fixed to the fixing target member. Then, as shown in FIG. 2, the wire harness W is routed inside the protector base 10 so as to extend in the longitudinal direction. Next, as shown in FIGS. 3 and 6, a wire harness-protective tape 30 is wound around the outer periphery of the wire harness W at a position outside the end portion of the protector base 10 in the longitudinal direction.

When winding the tape, since the wire harness-fixed protruding piece 25 is provided not on a protector base 10 side but on a cover 20 side to be attached to the protector base 10 later, the protruding piece 25 does not get in the way of the winding of the tape 30. That is, since there is no risk of the protruding piece 25 being wound together with the tape 30, it is not necessary to wind the tape 30 while lifting the wire harness W. Therefore, an operation can be made easier than in the related art.

When the wire harness W is lifted and the tape 30 is wound, positional deviation of the electric wires Wa configuring the wire harness W or collapse of an electric wire bundle may occur. By providing the protruding piece on the cover side, there is no need to worry about the positional deviation and the collapse.

When the winding of the tape 30 is finished, under the state, as shown in FIGS. 4 and 7, the cover 20 is put on the protector base 10 so as to cover the open upper face of the protector base 10. In order to facilitate winding of a binding band 40 after the cover 20 is put thereon, as shown in FIG. 4, the electric wires around which the tape 30 is wound may be brought close to the protruding piece 25.

Next, as shown in FIGS. 5 and 8, the binding band 40 as a fixing unit is wound around the outer periphery of the tape 30 and the protruding piece 25 and fastened at a position where the tape 30 is wound with respect to the wire harness-fixed protruding piece 25 protruding outward in the longitudinal direction from the end portion 20a of the cover 20 in the longitudinal direction, so that the wire harness W is accommodated in the inner corner space 25c of the protruding piece 25 and the wire harness W is fixed to the wire harness-fixed protruding piece 25 on the cover 20 side. At this time, as shown in FIG. 8, while abase portion 41 of the binding band 40 is held at a fixed position, an intermediate portion of a band portion 42 extending from the base portion 41 is passed through the recessed portion 25d on the protruding piece side wall 25b, and while the band portion 42 is wound around the outer periphery of the tape 30 and the protruding piece 25, a tip of the band portion 42 is inserted into an engagement hole of the base portion 41 to fasten the band portion 42. By doing so, the wire harness W can be easily, securely, and firmly fixed to the protruding piece 25 on the cover 20 side.

In this way, by fixing the wire harness W to the protruding piece 25 on the cover 20 side, the cover 20 and the wire harness W are kept in close contact with each other from the beginning. Therefore, when a stone, another wire harness, a bracket, or the like on the vehicle hit the cover 20 from the outside of the vehicle (since the protector base 10 side is the fixing target member side such as the vehicle body, the stone, another component on the vehicle, or the like mainly hit the cover 20 side), damage to the wire harness W due to an impact can be prevented. That is, for example, when the wire harness W is fixed to the protector base 10 side, the cover 20 and the wire harness W are not in close contact with each other. That is, since there is a play (movement allowance) between the cover 20 and the wire harness W, when the stone, another component, or the like hit the cover 20, an opening edge (edge) of the cover 20 may collide with the wire harness W and damage the wire harness W due to the impact acting on the cover 20. However, when the cover 20 and the wire harness W are in close contact with each other from the beginning as in the present embodiment, it is possible to prevent the possibility. Further, since the protruding piece is formed not on the protector base 10 side but on the cover 20 side, the protruding piece 25 itself can prevent the stone from the outside of the vehicle and another component on the vehicle from directly hitting the wire harness W, and thus the damage to the wire harness W can be prevented.

Further, as shown in FIG. 8, by fixing the wire harness W to the cover 20 side, the wire harness W can be held in a state of floating from the bottom wall 11 of the protector base 10. Therefore, in this case, even if water enters the protector base 10, the water inside the protector base 10 is easily discharged, and the wire harness W can be protected from water immersion.

In the above embodiment, the binding band 40 is used as a unit for fixing the wire harness W to the protruding piece 25 on the cover 20 side. In addition, a tape, a claw portion provided on the protruding piece 25, or the like can be used as the fixing unit. In the case of the tape, the wire harness W can be fixed to the protruding piece 25 by winding and fastening the wire harness W together with the protruding piece 25 with the tape. In the case of the claw portion, for example, the claw portion is provided on the protruding piece 25. The wire harness W can be fixed to the protruding piece 25 by press-fitting the wire harness W into a space formed by the claw portion.

Although the protector base 10 and the cover 20 are formed as separate molded articles in the above embodiment, the protector base 10 and the cover 20 may be connected by a hinge to form an integrally molded article. In this case, for example, it is preferable that the side walls 12 and 22 on the side opposite to the side on which the protruding piece 25 is provided are connected by the hinge.

Further, a temporary holding unit such as an electric wire presser may be provided inside the protector base 10 so that the wire harness W can be temporarily held. In this case, a position of the temporary holding unit such as the electric wire presser is preferably set at a position away from the end portion 20a provided with the protruding piece 25.

In the above embodiment, the wire harness W is configured with a bundle of the plurality of electric wires Wa, and may be configured with one electric wire.

Here, features of the wire harness routing method and the wire harness routing structure and the wire harness protector according to the embodiment of the present invention described above will be briefly summarized and listed in the following [1] to [5].

[1] A wire harness routing method includes:

preparing a gutter-like protector base (10) whose upper face is open, and routing a wire harness (W) inside the protector base (10) so as to extend in a longitudinal direction of the protector base (10);

winding a wire harness-protective tape (30) around an outer periphery of the wire harness (W) at a position outside an end portion of the protector base (10) in the longitudinal direction;

putting, under the above state, a cover (20) on the protector base (10) so as to cover the open upper face of the protector base (10); and fixing, by a fixing unit (40), at a position where the tape (30) is wound, the wire harness (W) to a wire harness-fixed protruding piece (25) protruding outward in the longitudinal direction from an end portion (20a) of the cover (20) in the longitudinal direction.

[2] The wire harness routing method according to [1], in which, a binding band (40), as the fixing unit, is wound around an outer periphery of the tape (30) and the wire harness-fixed protruding piece (25) at the position where the tape (30) is wound, and thereby the wire harness (W) is fixed to the wire harness-fixed protruding piece (25).

[3] A wire harness routing structure includes a wire harness protector (1) having including the gutter-like protector base (10) whose upper face is open and whose internal space serves as an accommodation space (13) for the wire harness (W) to extend along a longitudinal direction, and a cover (20) to be put on the protector base (10) so as to cover the open upper face of the protector base (10). The wire harness protector (1) is disposed on a routing path of a wire harness (W) under a state where a protector base (10) is fixed to a fixing target member. The wire harness (W) is routed inside the protector base (10) so as to extend in the longitudinal direction of the protector base. A wire harness-protective tape (30) is wound around an outer periphery of the wire harness (W) at a position outside an end portion of the protector base (10) in the longitudinal direction. The cover (20) is put on the protector base (10) so as to cover the open upper face of the protector base (10). The wire harness (W) is fixed by a fixing unit (40), at a position where the tape (30) is wound, to a wire harness-fixed protruding piece (25) provided to protrude outward in the longitudinal direction from an end portion (20a) of the cover (20) in the longitudinal direction.

[4] The wire harness routing structure according to [3], in which, a binding band (40) is used as the fixing unit, and the binding band (40) is wound around an outer periphery of the tape (30) and the wire harness-fixed protruding piece (25) at the position where the tape (30) is wound, and thereby the wire harness (W) is fixed to the wire harness-fixed protruding piece (25).

[5] A wire harness protector includes: a gutter-like protector base (10) whose upper face is open and whose inner space serves as an accommodation space (13) for a wire harness (W) to extend along a longitudinal direction of the protector base; and a cover (20) to be put on the protector base (10) so as to cover the open upper face of the protector base (10). The protector base (10) is configured as a member to be fixed to a fixing target member, and a wire harness-fixed protruding piece (25) is provided on an end portion (20a) of the cover (20) in the longitudinal direction, the protruding piece extending outward from an end portion of the protector base (10) in the longitudinal direction when the cover (20) is put on the protector base (10).

According to the wire harness routing method in the embodiment and the wire harness routing structure in the embodiment, the wire harness-fixed protruding piece is provided not on the protector base side but on the cover side covering the open upper face of the protector base. Therefore, when the wire harness-protective tape is wound around the outer periphery of the wire harness, the wire harness-fixed protruding piece on the cover side does not get in the way. That is, when there is the wire harness-fixed protruding piece on the protector base side, in order to prevent the protruding piece from being wound together with the tape, the tape needs to be wound around the outer periphery of the wire harness while lifting the wire harness. However, since the wire harness-fixed protruding piece does not get in the way, there is no need to lift the wire harness. Therefore, the operation of winding the wire harness-protective tape can be facilitated. When the wire harness is lifted and the tape is wound, the positional deviation of the electric wires configuring the wire harness or collapse of the electric wire bundle may occur. By providing the protruding piece on the cover side, it is possible to avoid the positional deviation and the collapse.

By fixing the wire harness to the protruding piece on the cover side, the cover and the wire harness are kept in close contact with each other from the beginning. Here, since the protector base side is a fixing target member side such as the case of the vehicle body or the electrical component, or the sheet metal for fixing the electrical component, the stone from the outside of the vehicle, components on the vehicle such as another wire harness, the bracket, or the like mainly hit the cover side, and it is possible to prevent the damage to the wire harness due to the impact when the components hit the cover. That is, for example, when the wire harness is fixed to the protector base side, the cover and the wire harness are not in close contact with each other. That is, there is play (movement allowance) between the cover and the wire harness. Therefore, when the stone, the component on the vehicle, or the like hit the cover, the impact acting on the cover may cause the opening edge (edge) of the cover to collide with the wire harness and damage the wire harness. However, since the cover and the wire harness are in close contact with each other from the beginning, the possibility of collision can be prevented. Further, since the protruding piece is formed not on the protector base side but on the cover side, the protruding piece itself can prevent the stone from the outside of the vehicle, another component on the vehicle, and the like from directly hitting the wire harness, and thus the damage to the wire harness can be prevented.

By fixing the wire harness to the cover side, the wire harness can be held in the state of floating from the bottom wall of the protector base. Therefore, even if the water enters the interior of the protector base, the water is easily discharged to the outside, and the wire harness can be protected from the water immersion.

According to the wire harness routing method in the embodiment, the wire harness can be easily and reliably fixed to the wire harness-fixed protruding piece on the cover side by fastening using the binding band as the fixing unit.

According to the wire harness routing structure in the embodiment, the wire harness can be easily and reliably fixed to the wire harness-fixed protruding piece on the cover side by fastening using the binding band as the fixing unit.

According to the wire harness protector in the embodiment, the wire harness-fixed protruding piece is provided not on the protector base side but on the cover side covering the open upper face of the protector base. Therefore, when the wire harness-protective tape is wound around the outer periphery of the wire harness, the wire harness-fixed protruding piece on the cover side does not get in the way. That is, when there is the wire harness-fixed protruding piece on the protector base side, in order to prevent the protruding piece from being wound together with the tape, the tape needs to be wound around the outer periphery of the wire harness while lifting the wire harness. However, since the wire harness-fixed protruding piece does not get in the way, there is no need to lift the wire harness. Therefore, the operation of winding the wire harness-protective tape can be facilitated. When the wire harness is lifted and the tape is wound, the positional deviation of the electric wires configuring the wire harness or collapse of the electric wire bundle may occur. By providing the protruding piece on the cover side, it is possible to avoid the positional deviation and the collapse.

By fixing the wire harness to the protruding piece on the cover side, the cover and the wire harness are kept in close contact with each other from the beginning. Here, since the protector base side is a fixing target member side such as the case of the vehicle body or the electrical component, or the sheet metal for fixing the electrical component, the stone from the outside of the vehicle, components on the vehicle such as another wire harness, the bracket, or the like mainly hit the cover side, and it is possible to prevent the damage to the wire harness due to the impact when the components hit the cover. That is, for example, when the wire harness is fixed to the protector base side, the cover and the wire harness are not in close contact with each other. That is, there is play (movement allowance) between the cover and the wire harness. Therefore, when the stone, the component on the vehicle, or the like hit the cover, the impact acting on the cover may cause the opening edge (edge) of the cover to collide with the wire harness and damage the wire harness. However, since the cover and the wire harness are in close contact with each other from the beginning, the possibility of collision can be prevented. Further, since the protruding piece is formed not on the protector base side but on the cover side, the protruding piece itself can prevent the stone from the outside of the vehicle, another component on the vehicle, and the like from directly hitting the wire harness, and thus the damage to the wire harness can be prevented.

By fixing the wire harness to the cover side, the wire harness can be held in the state of floating from the bottom wall of the protector base. Therefore, even if the water enters the interior of the protector base, the water is easily discharged to the outside, and the wire harness can be protected from the water immersion.

According to the present invention, when the protective tape is wound around the outer periphery of the wire harness, it is not necessary to lift the wire harness in particular, and the tape winding operation can be easily performed. When the wire harness is lifted and the tape is wound, the positional deviation of the electric wires configuring the wire harness or collapse of the electric wire bundle may occur. By providing the protruding piece on the cover side, it is possible to avoid the positional deviation and the collapse.

What is claimed is:

1. A wire harness routing method comprising:

preparing a gutter-like protector base whose an upper face is open, and routing a wire harness inside the protector base so as to extend in a longitudinal direction of the protector base;

winding a wire harness-protective tape around an outer periphery of the wire harness at a position outside an end portion of the protector base in the longitudinal direction;

putting, in a state that the wire harness-protective tape has been wound around the outer periphery of the wire harness, a cover on the protector base so as to cover the open upper face of the protector base; and fixing, by a fixing unit, at a position where the tape is wound, the wire harness to a wire harness-fixed protruding piece protruding outward in the longitudinal direction from an end portion of the cover in the longitudinal direction, wherein the wire harness-fixed protruding piece has an L-shaped cross section when viewed from a front in the longitudinal direction of the cover, and includes a protruding piece upper wall flush with an upper wall of the cover and a protruding piece side wall parallel to a side wall of the cover, and the wire harness is accommodated in an inner corner space formed by the protruding piece upper wall and the protruding piece side wall, and is fixed to the wire harness-fixed protruding piece at a side of the cover in a state of floating from a bottom wall of the protector base.

2. The routing method of the wire harness according to claim 1, wherein a binding band, as the fixing unit, is wound around an outer periphery of the tape and the wire harness-fixed protruding piece at the position where the tape is wound, and thereby the wire harness is fixed to the wire harness-fixed protruding piece.

3. A wire harness routing structure comprising:

a wire harness protector that includes a gutter-like protector base whose upper face is open and whose internal space serves as an accommodation space for a wire harness to extend along a longitudinal direction, and a cover to be put on the protector base so as to cover the open upper face of the protector base, wherein the wire harness protector is disposed on a routing path of a wire harness in a state that the protector base is fixed to a fixing target member, the wire harness is routed inside the protector base so as to extend in the longitudinal direction of the protector base, a wire harness-protective tape is wound around an outer periphery of the wire harness at a position outside an end portion of the protector base in the longitudinal direction, the cover is put on the protector base so as to cover the open upper face of the protector base, the wire harness is fixed by a fixing unit, at a position where the tape is wound, to a wire harness-fixed protruding piece provided to protrude outward in the longitudinal direction from an end portion of the cover in the longitudinal direction, the wire harness-fixed protruding piece has an L-shaped cross section when viewed from a front in the longitudinal direction of the cover, and includes a protruding piece upper wall flush with an upper wall of the cover and a protruding piece side wall parallel to a side wall of the cover, and the wire harness is accommodated in an inner corner space formed by the protruding piece upper wall and the protruding piece side wall, and is fixed to the wire harness-fixed protruding piece at a side of the cover in a state of floating from a bottom wall of the protector base.

4. The wire harness routing structure according to claim 3, wherein a binding band is used as the fixing unit, and the binding band is wound around an outer periphery of the tape and the wire harness-fixed protruding piece at the position where the tape is wound, and thereby the wire harness is fixed to the wire harness-fixed protruding piece.

5. A wire harness protector comprising:

a gutter-like protector base whose upper face is open and whose inner space serves as an accommodation space for a wire harness to extend along a longitudinal direction of the protector base; and a cover to be put on the protector base so as to cover the open upper face of the protector base, wherein the protector base is configured as a member to be fixed to a fixing target member, a wire harness-fixed protruding piece is provided on an end portion of the cover in the longitudinal direction, the protruding piece extending outward from an end portion of the protector base in the longitudinal direction when the cover is put on the protector base;

the wire harness-fixed protruding piece has an L-shaped cross section when viewed from a front in the longitudinal direction of the cover, and includes a protruding piece upper wall flush with an upper wall of the cover and a protruding piece side wall parallel to a side wall of the cover, and the wire harness is accommodated in an inner corner space formed by the protruding piece upper wall and the protruding piece side wall, and is fixed to the wire harness-fixed protruding piece at a side of the cover in a state of floating from a bottom wall of the protector base.

* * * * *